Sept. 19, 1950 G. V. CREMIEUX 2,523,098
AUTOMATIC TABLET COUNTING AND
BOTTLE FILLING MACHINE
Filed April 7, 1949 6 Sheets-Sheet 1

INVENTOR.
GEORGE V. CREMIEUX
BY
ATTORNEY

Sept. 19, 1950

G. V. CREMIEUX 2,523,098

AUTOMATIC TABLET COUNTING AND
BOTTLE FILLING MACHINE

Filed April 7, 1949

INVENTOR.
GEORGE V CREMIEUX
BY
*Zoltan H. Polacheff*
ATTORNEY

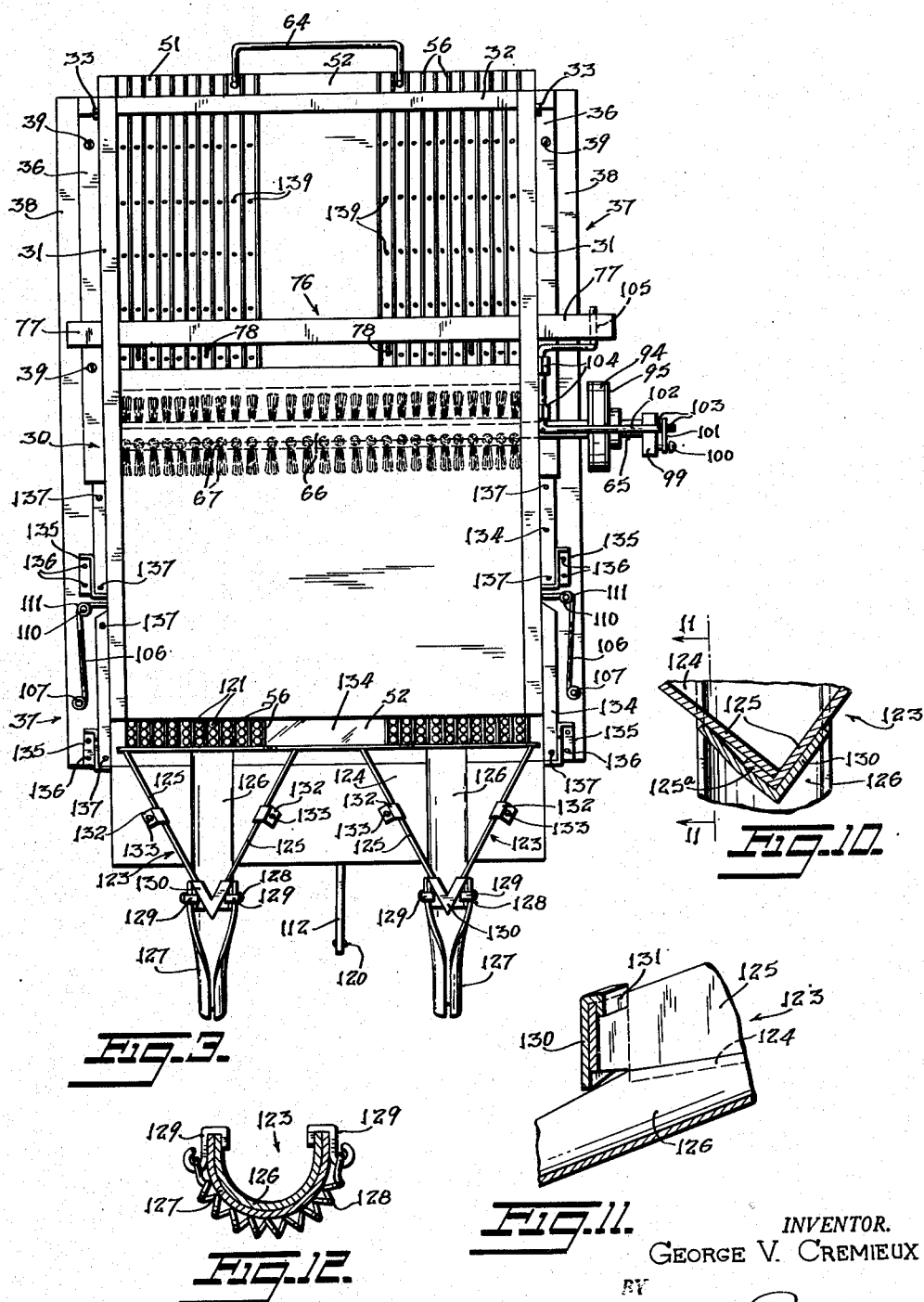

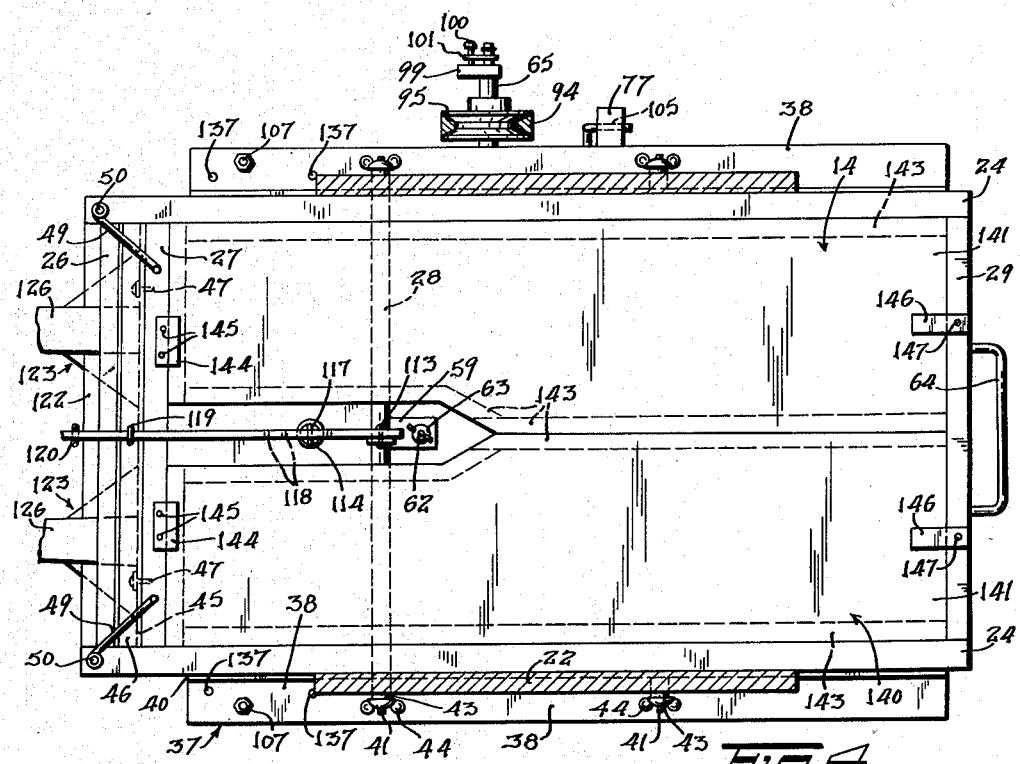
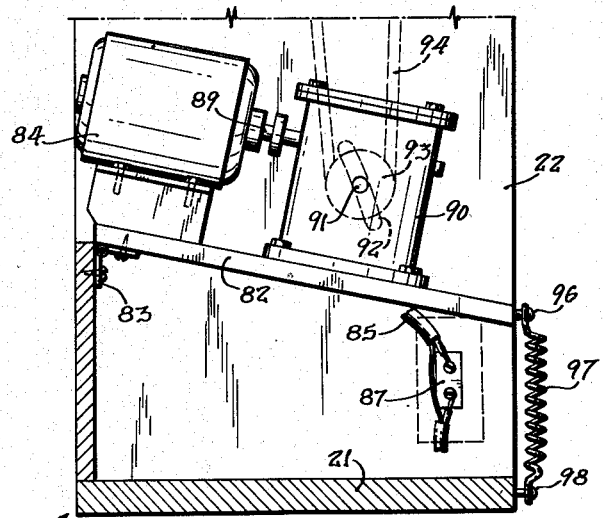

Sept. 19, 1950  
G. V. CREMIEUX  
AUTOMATIC TABLET COUNTING AND  
BOTTLE FILLING MACHINE  
2,523,098
Filed April 7, 1949  
6 Sheets-Sheet 5
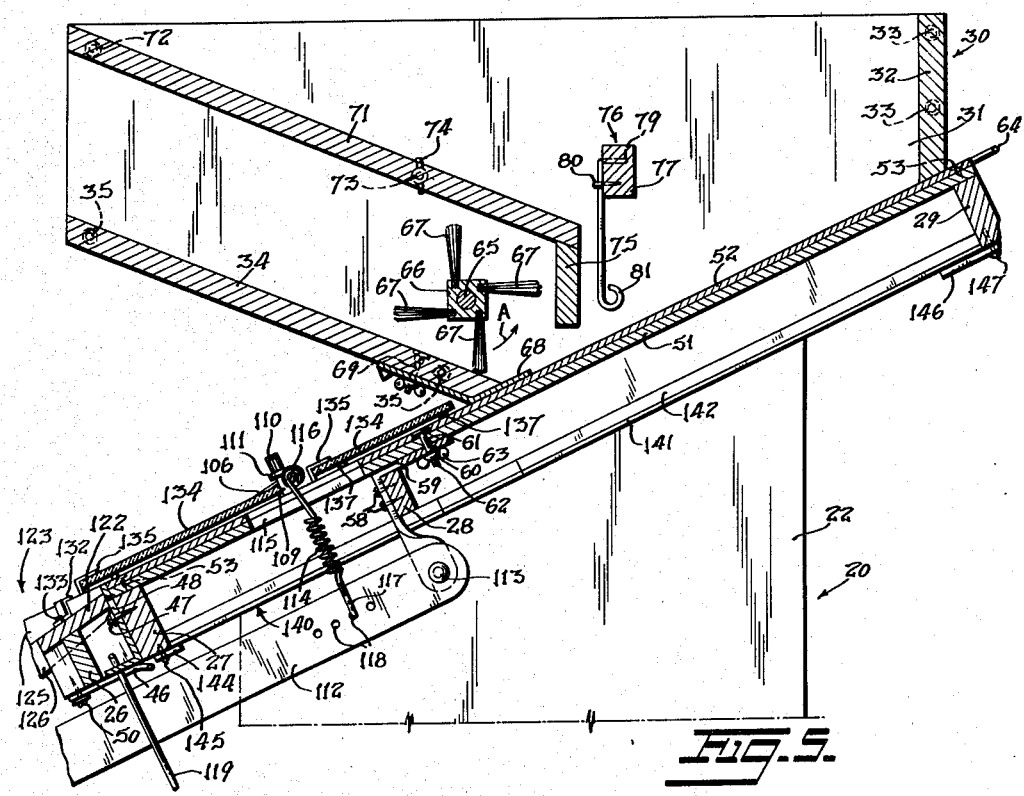
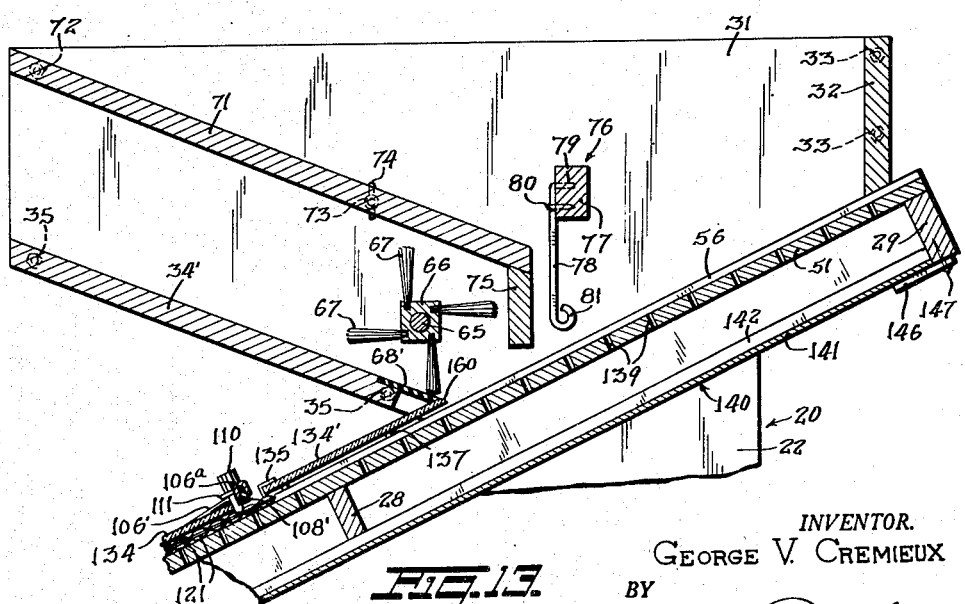
INVENTOR.  
GEORGE V. CREMIEUX  
BY  
ATTORNEY

INVENTOR.
GEORGE V. CREMIEUX
BY
ATTORNEY

Patented Sept. 19, 1950

2,523,098

UNITED STATES PATENT OFFICE 2,523,098

AUTOMATIC TABLET COUNTING AND BOTTLE FILLING MACHINE

George V. Cremieux, Orange, N. J.

Application April 7, 1949, Serial No. 86,049

15 Claims. (Cl. 226—2)

This invention relates to new and useful improvements in an automatic tablet counting and bottle filling machine.

More particularly, the present invention relates to an improved machine which is automatic in its operation to count out a given number of medicinal tablets or the like and then spill the counted out tables into their receiving bottles by one simple operation of a pivotally mounted lever.

Another object of the present invention proposes the construction of a machine which is efficient in operation, which can be efficiently operated by a single operator who need only keep the hopper of the machine filled with the tablets to be bottled, place the bottles on the end of the chutes from which the counted tablets discharge and pivot the control lever.

Still another object of the present invention proposes providing the machine with a counting board down which the tablets slide under the influence of gravity with means within the hopper arranged in a manner to insure that the tablets will be fed into the counting board in the desired single file.

A still further object of the present invention proposes providing the machine with a gate normally closing the lower end of the counting board and arranged in a manner to be lowered to permit the counted out tablets to enter the chutes and spill into the receiving bottles positioned on the ends of the chutes.

A further object of the present invention proposes a mechanism arranged in connection with the counting board for holding all of the tablets on the board, above the counted out tablets, back while the gate is in its lowered position so that only the counted tablets will spill from the board into the chutes.

The present invention further proposes connecting the gate and the holding mechanism to the pivotally mounted lever in a manner so that pivoting the lever will cause the holding mechanism to be brought into operation to hold back the desired tablets after which the gate is lowered to free the counted out tablets.

It is also an object of the present invention to make the counting board removable in a manner so that it can be removed when desired to be replaced by other counting boards designed to accommodate tablets of different diameters.

A still further object of the present invention proposes slidably mounting the hopper for movement relative to the counting board and to mount the holding mechanism to move with the hopper in a manner so that moving the hopper will also adjust the holding mechanism to permit any desired number of tablets to be counted out by the machine.

It is a further object of the present invention to construct a tablet counting and bottle filling machine which is simple and durable and which can be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 3 is a plan view of Fig. 1.

Fig. 4 is a horizontal sectional view taken substantially on the line 4—4 of Fig. 2.

Fig. 5 is an enlarged partial vertical sectional view taken substantially on the line 5—5 of Fig. 1.

Fig. 9 is a partial vertical sectional view taken on the line 9—9 of Fig. 1.

Fig. 10 is an enlarged partial horizontal sectional view taken on the line 10—10 of Fig. 1.

Fig. 11 is a partial vertical sectional view taken on the line 11—11 of Fig. 10.

Fig. 12 is an enlarged sectional view taken on the line 12—12 of Fig. 1.

Fig. 13 is a view similar to a portion of Fig. 6, but illustrating the tablet counting and bottle filling machine constructed in accordance with a modification of the present invention.

The automatic tablet counting and bottle filling machine, according to the first form of the present invention shown in Figs. 1 to 12, includes a frame 20, constructed of wood, which is to be rested on a table or other elevated support. The frame 20 is comprised of a base wall 21, vertical side walls 22 and a low back wall 23 mounted between the side walls 22 and attached at its bottom edge to the rear edge of the base wall 21. It is the base wall 21 which is rested on the table or other elevated support, not shown.

Figure 1:
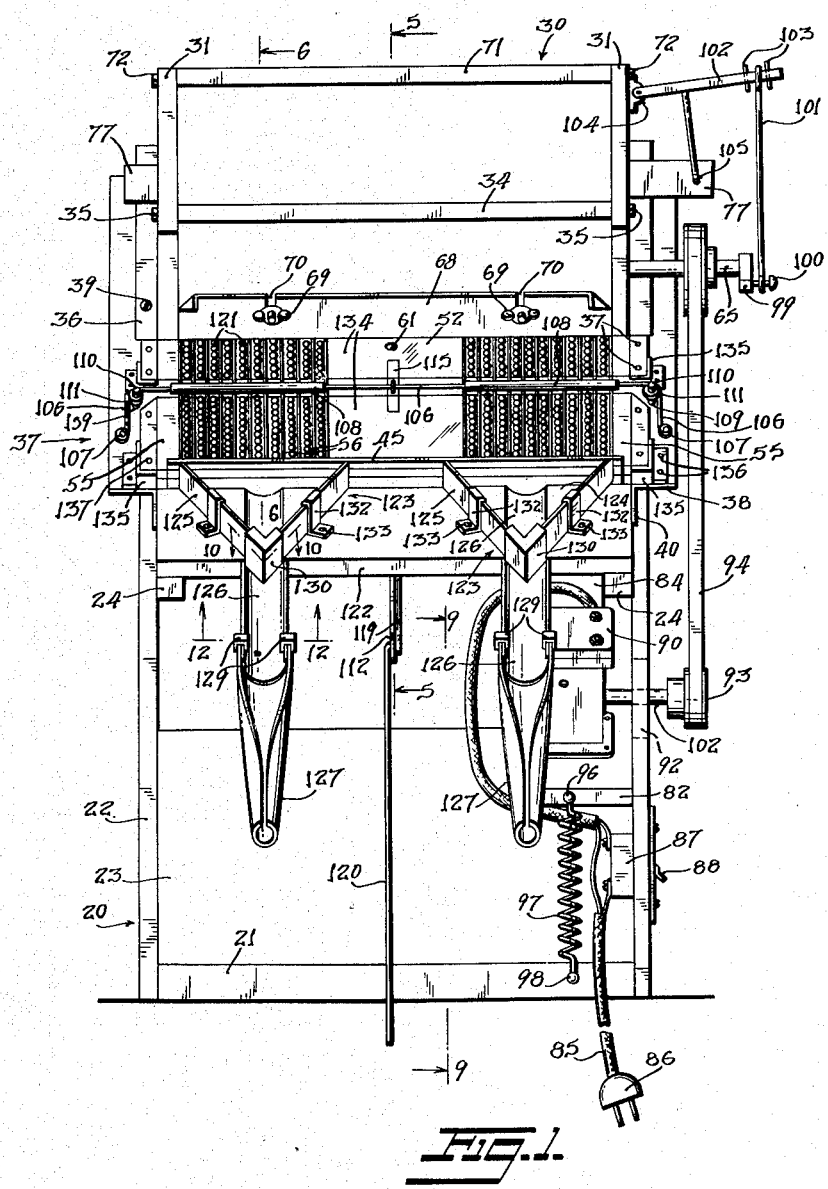
Fig. 1 is a front elevational view of the automatic tablet counting and bottle filling machine constructed in accordance with the present invention.
Figure 2:
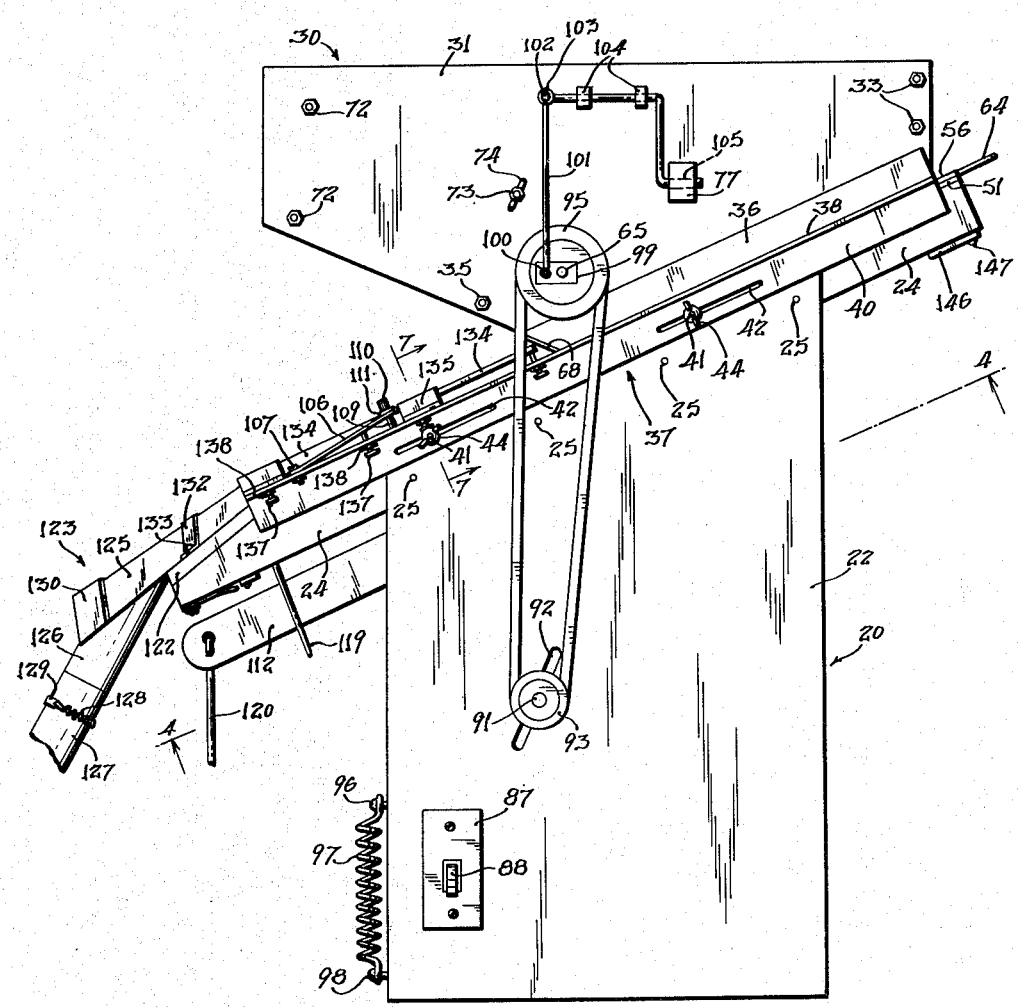
Fig. 2 is a side elevational view looking from the right side of Fig. 1.
Figures 7, 8:
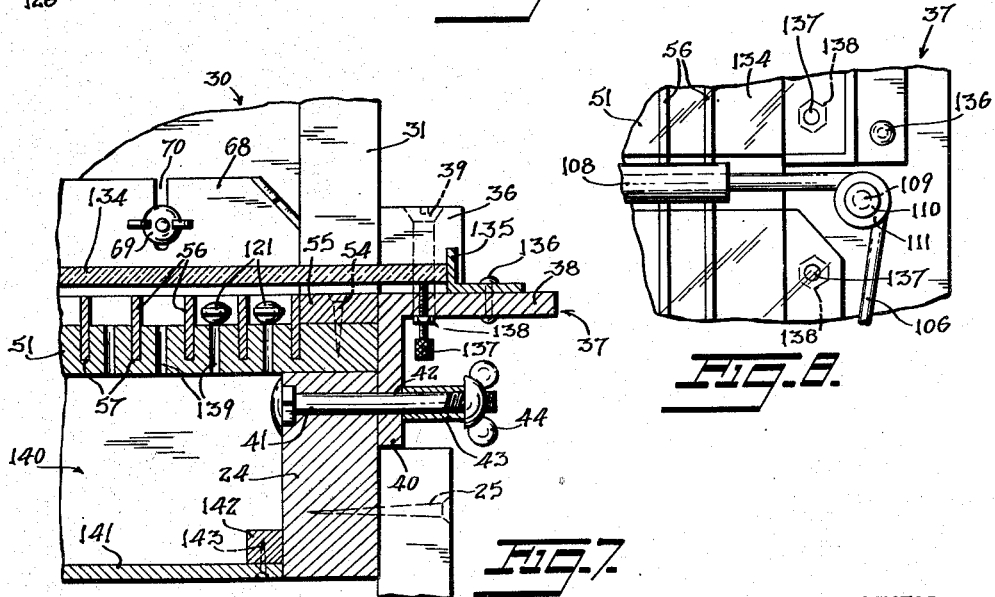
Fig. 7 is an enlarged partial transverse vertical sectional view taken substantially on the line 7—7 of Fig. 2.
Fig. 8 is an enlarged detailed plan view of a portion of Fig. 3.

The top ends of the side walls 22 are inclined downward and forward, and attached to the inside faces of the side walls 22, at the top ends thereof, there is a pair of guide rails 24, see Figs. 1, 2 and 7. The guide rails 24 are formed of wood and are inclined downward and forward parallel to the downwardly and forwardly inclined top edges of the side walls 22. The guide rails 24 are secured in position with their top faces slightly above the top edges of the side walls 22, as shown in Fig. 7, by means of nails 25.

Extended between the adjacent faces of the guide rails 24 there are connecting stringers 26, 27, 28 and 29 for holding the guide rails even and parallelly spaced and for providing mountings for certain of the parts of the machine, as will become clear as this specification proceeds. The stringer 28 is somewhat narrower than the other stringers for a purpose which will be explained later in this specification.

A hopper 30 is adjustably mounted on the portions of the guide rails 24 which project above the top ends of the side walls 22 of the frame 20. The hopper 30 is formed of spaced side walls 31 which have the back portions of their bottom edges inclined downward and forward parallel to the downward and forward inclination of the guide rails 24 and the front portions of their bottom edges inclined upwardly and forwardly from the bottom edges of the downwardly and forwardly inclined rear portions. The rear ends of the side walls 31 are connected together by a back wall 32 secured in position by several bolts 33. Secured in position between the upwardly and forwardly inclined front portions of the side walls 31, there is a bottom wall 34, which is held in position by several bolts 35. The bottom of the hopper 30 is open between the rear edge of the bottom wall 34 and the bottom edge of the back wall 32.

Extending laterally from the outer faces of the side walls 31 of the hopper 30, there are ledges 36 and beneath the ledges there are angle irons 37. The angle irons 37 have horizontal arms 38 extended along the bottom faces of the ledges 36 and to which the ledges are secured by several screws 39. The angle irons 37 also have vertical arms 40 extended along the outer faces of the guide rails 24. Bolts 41 extend through the guide rails 24 and project through elongated slots 42 formed in the vertical arms 40 of the angle irons 37. Tubes 43 are engaged on the outer ends of the bolts 41 and are engaged by thumb nuts 44 threaded onto the bolts 41 for clamping the angle irons 37 in adjusted positions on the guide rails 24. In the loosened condition of the thumb nuts 44, the angle irons 37 together with the hopper 30 can be adjusted on the guide rails 24 within the limits of the length of the elongated slots 42.

Vertically slidably mounted on the front face of the stringer 27, there is a gate 45 formed of a length of metal and which has forwardly extending front flange 46. The gate 45 is vertically slidably supported by several screws 47 which pass through spaced vertical slots 48 formed in the gate 45 and which threadedly engage the stringer 27. Elongated flexible wires 49, each have one of their ends secured to one of the guide rails 24 by means of screws 50, see Figs. 4, 5 and 6, and their free ends of the wires 49 are projected across the bottom face of the flange 46 of the gate 45 for normally holding the gate in a raised position in which its top edge is projected above the top edge of the stringer 27, as shown in Figs. 5 and 6.

Interposed between the frame 20 and the hopper 30, there is a counting board 51 preferably formed of a fibre material. The top face of the counting board 51 is divided into separate counting units by a dividing wall 52 secure to the top face of the counting board 51, at the center thereof, by several nails 53, see Fig. 5. Secured to the side edges of the top face of the counting board 51, by means of nails 54, there are edge strips 55, see Figs. 1 and 7. Between the adjacent faces of the dividing wall 52 and the edge strips 55 there are the separate counting units. Each of the counting units is sub-divided into a plurality of equal channels by a plurality of longitudinally extending parallel metal strips 56. The metal strips 56 are secured in position within complementary grooves 57 cut in the top face of the counting board 51. The channels are of a width to accommodate the particular type of tablet being counted and bottled and on the drawings, each of the counting units is illustrated as being comprised of ten channels, but that number may be varied as desired.

Figure 6:
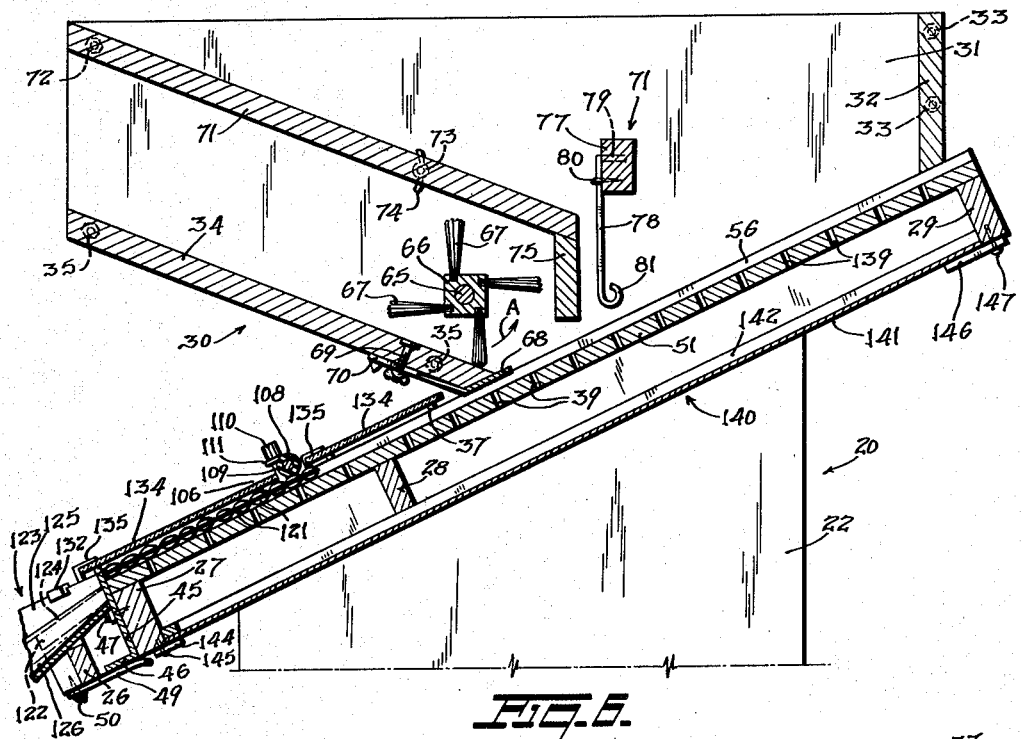
Fig. 6 is a view similar to Fig. 5 taken on the line 6—6 of Fig. 1.

As shown in Figs. 5, 6 and 7, the hopper 30 is positioned above the frame 20 a distance to snugly receive between them the counting board 51. The counting board 51 is inclined downwardly and forwardly so that the tablets being counted will slide down within the channels under the influence of gravity and the front bottom edge of the counting board rests against the gate 45, so that the gate closes the bottom ends of the channels and prevents the tablets from spilling from the bottom ends of the channels, except when the gate is lowered as will be hereinafter explained.

Attached to the stringer 28, intermediate of its ends, by several screws 58, see Fig. 5, there is an L-shaped member 59. One arm of the L-shaped member 59 extends along the bottom face of the counting board 51 and is formed with a hole 60 aligned with a complementary hole 61 formed in the counting board. A bolt 62 is extended through the aligned holes 60 and 61 and is threadedly engaged by a thumb nut 63 for securing the counting board 51 in position. When the bolt 62 is removed, the counting board 51 is free to be pulled from between the frame 20 and the hopper 30 at the rear end of the machine. To facilitate this pulling the rear of the counting board 51 is formed with a rearwardly extending handle 64. When the counting board 51 is removed it can be interchanged with other counting boards (not shown) having a different arrangement of the channels so as to accommodate tablets of different thicknesses and diameters.

Mechanical means is provided for agitating the tablets placed within the hopper 30 to cause them to be continuously fed through the open bottom of the hopper and singly into the channels of the counting board 51. The mechanical means is characterized by a shaft 65 rotatively extended between the side walls 31 of the hopper 30 slightly above the rear edge of the bottom wall 34 of the hopper, as shown in Figs. 5 and 6. Fixedly mounted on the shaft 65, between side walls 31, there is a brush 66 having four sets of laterally extending bristles 67. Thus, the brush 66 rotates with the shaft 65 when the shaft rotates. The free ends of the bristles 67 operate across the top face of a baffle plate 68 which is adjustably secured to the bottom face of the bottom wall 34 by several nut and bolt assemblies 69 which pass through elongated slots 70 formed in the baffle plate 68. Adjustment of the baffle plate 68 permits it to be seated against the top edges of the metallic strips 56 of counting boards 51 of different thicknesses.

Extended across the space between the side walls 31 of the hopper 30, there is a wall 71 which is inclined downward and rearward substantially parallel to the bottom wall 34 of the hopper 30. The front end of the wall 71 is pivotally supported in position by means of bolts 72 so that the rear end thereof may be raised and lowered. The wall 71 is held in a desired adjusted position by means of bolts 73 which pass through elongated slots 74 formed in the side walls 31 and which are threadedly engaged into the sides of the wall 71. The slots 74 are arranged arcuately concentric with the bolts 72. Depending from the rear edge of the wall 71, there is a baffle flange 75, see Figs. 3, 5 and 6, which extends the width of the hopper 30 along the back of the brush 66. As the wall 71 is raised or lowered, the spacing of the bottom edge of the baffle flange 75 is adjusted with relation to the top face of the counting board 51 to control the passage of the tablets in the hopper 30 toward the brush 66.

An agitator 76 is provided within the hopper 30 for stirring up the tablets within the hopper 30 so as to prevent them from becoming jammed up back of the space between the baffle flange 75 and the top face of the counting board 51. The agitator 76 is characterized by a bar 77 slidably extended through the side walls 31 of the hopper slightly to the rear and above the back edge of the wall 71, as shown in Figs. 3, 5 and 6. Within the hopper 30, there is a plurality of fingers 78 depending from the bar 77. The top ends of the fingers 78 are bent to extend into complementary openings 79 formed in the bar 77, and staples 80 secure the top ends of the fingers 78 in position. The fingers 78 are formed of relatively stiff wire and have their bottom ends bent into loops 81 to most effectively stir up the tablets when the bar 77 is oscillated to and fro.

Means is provided to simultaneously turn the shaft 65 to rotate the brush 66 and to oscillate the bar 77 to and fro. This means is characterized by a platform 82, see Figs. 1 and 9, disposed between the side walls 22 of the frame 20 and pivotally supported at its rear edge upon the top edge of the back wall 23, by means of a hinge 83. Mounted on the top face of the platform 82, toward the rear thereof, there is an electric motor 84. Leading from the motor 84, there is an electric cord 85 having a plug 86 for insertion in an electric receptacle to furnish the electric current required to rotate the motor 84. A switch 87 is mounted on the side wall 22 of the frame 20 and has an operating toggle 88 exposed at the side of the frame 20 and is connected in the cord 85 for controlling the supply of electric current to the motor 84.

The driven shaft 89 of the electric motor 84 is connected to a speed reduction unit 90 which is also mounted on the platform 82 forward of the electric motor 84. The speed reduction unit 90 has its driven shaft 91 extended through an elongated arcuate slot 92 formed in the side wall 22 concentric with the pivot point of the hinge 83. Mounted on the extended end of the shaft 91 there is a pulley 93, see Fig. 1, engaged by a continuous belt 94. The belt 94 is extended upward and engaged over a second pulley 95 mounted on an extended end of the brush shaft 65. Thus, when the motor 84 is in operation, the brush 66 will be continuously rotated in the direction of the arrow A on Figs. 5 and 6 to brush the tablets back from the baffle plate 68 and permit the tablets to enter the channels of the counting board 51 one at a time and in single file.

Pivotally mounting the platform 82 and having the driven shaft 91 of the speed reduction unit 90 extended through the elongated arcuate slot 92 permits the platform 82 to adjust itself in agreement with the adjustments effected on the hopper 30 with relation to the guide rails 24. To insure a proper driving tension on the belt 94, there extends from the free edge of the platform 82, a pin 96 to which the top end of a contraction spring 97 is attached. The bottom end of the contraction spring 97 is attached to a pin 98 which projects from the front edge of the base wall 21 of the frame 20. The spring 97 also permits slippage of the pulley 93 with relation to the belt 94 in the event the machine becomes jammed and so prevents the tablets in the hopper 30 from being broken and pulverized.

The power to continuously oscillate the bar 77 to and fro is taken from the brush shaft 65. To accomplish this, there is mounted on the projected end of the shaft 65, beyond the pulley 95, a radially extending arm 99 from the free end of which a pin 100 extends to traverse a circular path as the shaft 65 rotates. A link 101 has its bottom end rotatively curled about the pin 100 and its top end rotatively curled about the free end of a crank 102 between a pair of cotter pins 103 mounted in holes formed in that free end of the crank. The crank 102 is pivotally supported intermediate of its ends upon the side wall 31 of the hopper 30 by means of several spaced brackets 104, see Fig. 2. The other end of the crank 102 is bent downward and turnably extended into a complementary hole 105 formed in the adjacent end of the bar 77 of the agitator 76. When the shaft 65 is rotated, the bar 77 will be oscillated to and fro so that the fingers 78 will stir up the tablets within the hopper 30 so that they will continuously feed through the space between the bottom edge of the baffle flange 75 and the top face of the counting board 51.

Mechanism is provided on the front ends of the angle irons 37 for holding back the tablets, in the channels, behind a pre-selected number, when the gate 45 is lowered to permit that pre-selected number to spill from the front lower ends of the channels of the counting board 51. This mechanism is comprised of a U-shaped member 106 which is formed of a relatively stiff wire and which has the free ends of its side arms secured to the top faces of the horizontal arms 38 of the angle irons 37 by means of nut and bolt assemblies 107, see Figs. 1 and 2. The intermediate arm of the U-shaped member 106 extends across the top face of the counting board 51 and mounted on that intermediate arm there is a pair of aligned pressure pads 108; one pad for each of the tablet counting units of the counting board 51. The pressure pads 108 are formed of rubber so that they will not crush the tablets, in the channels, with which they are engaged.

The U-shaped member 106 has a natural bias which holds the bottom of the pressure pads 108 spaced from the top face of the counting board 51 so that the tablets are normally free to slide past the pads in the channels of the counting board. To limit the degree of spacing of the pressure pads 108 from the face of the counting board 51, there are threaded into the angle irons 37, studs 109 at the junction of the side arms of the U-shaped member 106 with its intermediate arm. The top ends of the studs 109 are formed with enlarged knurled heads 110 by which the studs 109 can be adjusted. Washers 111 are slidable on the studs 109 beneath the heads 110 to be engaged by the U-shaped member 106 and limit movement thereof in a direction away from the counting board 51.

As previously described, the angle irons 37 are adjustably mounted on the guide rails 24 for forward and rearward adjustment relative thereto. Mounting the U-shaped member 106 on the angle irons 37, causes the member 106 to be adjusted with the angle irons 37 with relation to the gate 45. Thus, the mere act of adjusting the angle irons 37 with relation to the frame 29 permits any pre-selected number of tablets, in multiples of ten as there are ten channels in each of the counting units of the counting board 51 shown on the drawings, to be counted out by the machine. However, that multiple number can be varied by substituting different counting boards having a different number of channels in each counting unit— for example, a board having five channels could be used so that the tablets could be counted out in multiples of five.

Means is provided for first lowering the U-shaped member 106 into its operative position and for then lowering the gate 45 to permit the pre-selected number of tablets to spill from the channels of the counting board 51. The means is comprised of a lever 112, see Figs. 4 and 5, which is pivotally attached at its rear end to the bottom end of the depending arm of the L-shaped member 59 by means of a single pivot pin 113. A contraction spring 114 has one end projected upwardly through an elongated slot 115 formed in the counting board 51 between the adjacent counting units thereof. That one end of the contraction spring 114 is bent into a loop 116 and is engaged over the intermediate arm of the U-shaped member 106 between the adjacent ends of the pressure pads 108. The bottom end of the spring 114 is bent into a hook 117 which is selectively engageable with one of a line of complementary apertures 118 formed in the lever 112.

The elongated slot 115 permits free adjustment movement of the U-shaped member 106 with the angle irons 37 and when it is desired to remove the counting board 51 from the machine, the loop 116 is disengaged from the U-shaped member 106 and passed downward through the slot 115 freeing the board 51 to be withdrawn from the machine. The natural bias of the U-shaped member 106 is such that it exerts a force greater than that exerted by the spring 114, when the lever 112 is in its raised position, or preferably, the spring 114 is under no tension when the lever 112 is raised, so that the U-shaped member 106 will hold the pressure pads 108 in a normal raised position so that the tablets may have free passage beneath the pressure pads.

Depending from the front flange 46 of the gate 45, there is a wire 119. The wire 119 has its ends attached to the front flange 46 of the gate 45 and has its intermediate portion looped beneath an intermediate portion of the lever 112, so as to pull the gate 45 downward to an open position when the lever 112 is pivoted downward. The free end of the lever 112 is extended from the front of the machine and has the top end of a link 120, see Figs. 1, 2 and 3, pivotally attached thereto. The bottom end of the link 120 is connected to a pivotally mounted foot pedal, not shown, so that when the foot pedal is pivoted the lever 112 will be pivoted downward.

The tablets in the channels of the counting board are designated on Figs. 1, 3, 6 and 7 of the drawings, by the reference numeral 121. Normally, the gate 45 and the pressure pads 108 will be in the position shown in Fig. 6, and the tablets 121 will be free to slide downward in the channels of the counting board 51, beneath the pressure pads 108 and arrange themselves single file in the channels of the counting board behind the gate 45. When the lever 112 is pivoted downward by depressing the foot pedal, not shown, the spring 114 will be stretched exerting a pull which will draw downward on the intermediate arm of the U-shaped member 106, against the natural bias of that member, and cause the pressure pads 108 to be engaged against the tops of the tablets 121 immediately below the pressure pads, see Fig. 6. This action will clamp those tablets 121 against the top face of the counting board 51 and hold those tablets and all of the tablets behind those tablets, in the channels of the counting board, from sliding downward in the channels when the tablets to the front of those clamped tablets move away therefrom. As pivoting of the lever 112 is continued, the spring 114 will be further stretched increasing the pressure or downward pull on the intermediate arm of the U-shaped member 106; however, that increased pressure will be absorbed by the pressure pads 108 preventing the clamped tablets 121 from being crushed. Finally, during downward pivoting of the lever 112, that lever will engage the wire 119 and draw the gate 45 downward against the action of the flexible wires 49 opening the bottom ends of the channels of the counting board 51, so that all of the tablets 121, to the front of those being held by the pressure pads 108, may slide from the bottom ends of the channels.

After the desired tablets have been discharged, the pressure on the foot pedal, not shown, is released and the tension on the spring 114 will draw the lever 112 back to its starting position. During the return movement, the gate 45 will first be released to be returned to its normal position closing the bottom ends of the channels of the counting board. Then the pressure on the U-shaped member 106 will be released so that its natural bias will lift the pressure pads 108 off the tablets 121 being clamped against the counting board 51, so that the tablets in the channels may slide downward to fill the vacated space between the gate 45 and the pressure pads 108.

Mounted across the lower front ends of the guide rails 24, in front of the gate 45, there is a board 122 which is also supported on the front-most stringer 26. Chutes 123, one for each of the counting units of the counting board 51, are mounted on the board 122. Each of the chutes 123 is formed of sheet metal and each has a base wall 124 and a pair of upstanding forwardly converged side walls 125. Intermediate of their widths each of the base walls 124 of the chutes 123 is formed with a downwardly and forwardly extended grooved portion 126 which extends for some distance beyond the apex ends of the converged side walls 125 of the chutes 123.

Removably mounted on the projected front ends of the grooved portions 126, there are nozzles 127, also formed of sheet metal, and which have their free ends bent into substantially complete circles, as shown in Figs. 1 and 3, to be received in the neck openings of the bottles which are to be filled with the tablets 121 which are being counted and dispensed by the machine. The nozzles 127 have their rear ends engaged about the grooved portions 126 and are secured in position by spring members 128 formed at their ends with hooks 129 which are engaged over the overlapped portions of the grooved portions 126 and the nozzles 127. Thus, when the hooks 129 are disengaged the nozzles 127 can be removed and replaced by other nozzles having different sized free ends to be snugly received in different sized neck openings of various types of bottles.

On the front end of one of the side walls 125 of each of the chutes 123, there is an extension 125a, see Fig. 10, which is bent to extend along the outer face of the other side wall of that chute. The front ends of the side walls 125 are connected together by a connector 130 which is bent vertically to conform to the apex end of each of the chutes. The top end 131, see Fig. 11, of each of the connectors 130 is bent to extend over the top edges of the side walls 125 and so connect their front ends together. The connectors are of a height to have their bottom ends extend partially into the open tops of the grooved portions 126 and so direct any tablets 121 which spill into the chutes 123 into the grooved portions 126. The chutes 123 are secured to the board 122, by brackets 132 which have their top ends bent to extend over the top edges of the side walls 125 intermediate of their ends. The bottom ends of the brackets 132 are secured to the board 122 by means of screws 133.

When the gate 45 is lowered and the tablets 121 spill from the bottom ends of the channels of the counting board 51, those tablets will be collected by the chutes 123 and directed through the grooved portions 126, through the nozzles 127 and into the bottles positioned upon the front ends of the nozzles 127.

Those portions of the counting board 51, between the gate 45 and the pressure pads 108 and between the pressure pads 108 and the front of the hopper 30, are covered by panes of glass 134. The bottom corners of the panes of glass 134 are disposed in corner brackets 135 which are secured to the horizontal arms of the angle irons 37 by means of rivets 136. To retain the panes of glass 134 at the proper elevation above the top edges of the metallic strips 56 to permit a free sliding movement of the tablets 121 within the channels of the counting board 51 and still retain the tablets in the desired single file, elevating screws 137 are threaded through the horizontal arms 38 of the angle irons 37 to engage the bottom faces of the panes of glass 134. Lock nuts 138 are threadedly mounted on elevating screws 137 to be tightened against the bottom face of the horizontal arms 38 of the angle irons 37 to hold the elevating screws 137 in the desired adjusted position.

The panes of glass 134 are completely removable so that when desired they can be lifted out of the corner brackets 135 to permit the channels to be conveniently cleaned or to relieve a jam up of tablets 121 which might form in any one or more of the channels.

The present machine is designed to count and bottle uncoated tablets, such as tablets of aspirin, bicarbonate of soda and the like medicinal tablets, and such tablets when being handled by the machine form dust and small tablet particles which are separated from the tablets. To continuously rid the channels of the counting board 51 of that dust and tablet particles, each of the channels is formed along its length with a plurality of spaced openings 139 through which the dust and tablet particles may freely pass to the underside of the counting board. Mounted beneath the counting board 51 on the frame 20 of the machine, there is a pair of adjacent dust and tablet particle collecting trays 140. Each of the trays 140 is formed of a flat board 141 bounded along its front and side edges by narrow strips 142 secured in position by short brads 143, see Fig. 7.

As shown in Fig. 4, each of the trays 140 is of a length to extend between the stringers 27 and 29 and the adjacent front corners of the trays are shaped to extend about the L-shaped bracket 59, the spring 114 and the lever 112. As the stringer 28 is narrower than the stringers 27 and 29, as previously described, by the depth of the trays 140, the trays extend continuously below the bottom edge of that stringer 28.

Mounted on the stringer 27, at the front end of each of the trays 140, there is a block 144, each of which is secured in position by several brads 145, see Fig. 4. The front ends of the trays 140 are rested on the blocks 144. Latches 146 are pivotally mounted on the stringer 29 by means of pivot pins 147 to be pivoted beneath the rear ends of the trays 140 to support the rear ends of the trays in position. When the latches 146 are pivoted so that their lengths extend parallel to the length of the stringer 29, the rear ends of the trays 140 will drop downward freeing the trays to be lifted off the blocks 144 and to be removed from the back of the machine to be emptied of the collected dust and tablet particles. To return the trays 140 to their normal position the above procedure is reversed.

The operation of the machine is as follows:

The desired counting board 51, having the desired number of channels and the desired width of channels in each of its counting units, is slipped into position beneath the hopper 30 and is secured in position by the bolt 62 and thumb nut 63, see Fig. 5. The tablets 121 to be counted and bottled are then spilled into the open top of the hopper 30. The switch 87 is then thrown to energize the motor 84 to rotate the brush 66 and oscillate the bar 77 of the agitator 76 to and fro. This will agitate the tablets 121 within the hopper and cause them to slide single file downward in the channels of the counting board and stack up behind the gate 45. When the operator sees that all of the channels of the counting board 51 are completely filled with tablets 121 he then momentarily stops the motor 84.

The number of tablets 121 between the gate 45 and the pressure pads 108, in one of the channels, are then counted and if the board has ten channels in each counting unit and it is desired to bottle 100 of the tablets, the number of tablets in the counted channel should be ten. The machine is then properly set, but if the counted tablets should be a number other than ten, then the thumb nuts 44 are loosened freeing the angle irons 37 to be slid forward or rearward, as required, to bring the pressure pads 108 over the proper lateral line of tablets 121. When the proper adjusted position is reached, the thumb nuts 44 are again tightened to hold the angle irons 37 in that adjusted position.

The motor 84 is again set in operation and two of the bottles to be filled are engaged upon the front ends of the nozzles 127. The foot pedal, not shown, is then depressed to pivot the lever 112 downward to engage the pressure pads 108 against the tablets 121 located therebeneath and to open the gate 45 to allow all of the tablets 121, in the channels, in front of the pressure pads 108, to slip from the bottom of the channels into the chutes 123. From the chutes 123, these dispensed tablets 121 will pass through the grooved portions 126, through the nozzles 127 and into the bottles engaged upon the nozzles.

After all of the released tablets have spilled from the bottom ends of the channels into the chutes 123, the pressure on the foot pedal, not shown, is released permitting the gate 45 to be closed by the flexible wires 49 and permitting the U-shaped member 106 to raise the pressure pads 108 off the tablets 121 to free the tablets 121 which were held in the channels by the pressure pads 108 to slide downward in the channels and fill the vacated spaces between the gate 45 and the pressure pads 108. When the operator sees, through the lowermost pane of glass 134, that all of the channels are again filled and when fresh bottles have been engaged upon the nozzles 127, the foot pedal, not shown, is again depressed to lower the gate 45 and engage the pressure pads 108 against the tablets 121 located therebeneath.

Periodically, the supply of tablets in the hopper 30 is replenished and the motor 84 is allowed to continuously rotate to agitate the tablets in the hopper 30, through the medium of the brush 66 and the agitator 76 to cause the tablets to be fed continuously in single file into the channels of the counting board.

Figure 14:
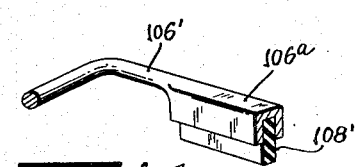
Fig. 14 is a partial perspective view of the U-shaped member used in the form of the invention shown in Fig. 13.

In the modified form of the invention shown in Figs. 13 and 14, the top pane of glass 134' has its top edge extended into the bottom of the hopper 30 and formed with a top bevel 160 across which the free ends of the bristles 67 of the brush 66 sweep. The bottom wall 34' of the hopper 30 has its innermost bottom end stopped short of the top face of the top pane of glass 134' and is provided with a baffle plate 68' which engages the top face of the top pane of glass 134'. In this form of the invention, the baffle plate 68' comprises a length of rubber secured along one edge, as by cementing or the like, to the inner end of the bottom wall 34' with its free edge resting on the top face of the top pane of glass 134'.

The mechanism on the front ends of the angle irons for holding back the tablets, in the channels, behind the pre-selected number which are to spill from the channels when the gate is lowered, is also different from that used in the previous form of the invention. In this modified form of the invention, the U-shaped member 106' of that mechanism has its intermediate arm formed with a channel 106ª, see Fig. 14, in which the pressure pads 108' are mounted. The pressure pads 108' are in the form of strips of rubber having their top edges cemented in position in the channel 106ª with their bottom edges projecting from the channel to engage the tablets 121 in the channels of the counting board 51 when the U-shaped member 106' is lowered against the action of its natural bias.

This modified form of the invention adapts the machine to be used for bottling vary small tablets preventing any jam of the tablets under the baffle plate 68' and the related parts of the machine. To adjust for differently sized tablets 121, it is merely necessary to adjust the spacing of the panes of glass 134 and 134' relative to the counting board 51, by means of the screws 137 and the resiliency of the baffle plate 68' will cause it to mimic movements of the pane of glass 134'.

In other respects the modified form of the invention is similar to that previously described and like reference numerals are used to identify like parts in all of the views.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new and desire to secure by United States Letters Patent is:

1. An automatic tablet counting and bottling machine comprising a frame having a downwardly and forwardly inclined top portion, a counting board having a plurality of counting channels removably mounted on said frame, a hopper adjustably mounted on said frame over said counting board to receive a quantity of the tablets to be counted and bottled, means for agitating the tablets contained in the hopper to cause them to be fed singly into the channels of said counting board, a gate at the front end of said counting board to hold the tablets in the channels until released, mechanism for holding all of the tablets in the channels behind a pre-selected lateral line of tablets in the channels when the gate is lowered to free the tablets in front of said lateral line to spill from the open bottom ends of said channels, and means for lowering said gate and simultaneously bringing said mechanism into operation, and a chute mounted on the front of said frame at the lower ends of said channels into which said tablets are spilled when said gate is lowered, said counting board having its channels subdivided into a pair of adjacent counting units with a chute for each of said units, each of said chutes being formed of sheet metal and formed with a grooved portion which has its front end projected beyond the front end of the body of the chute, a nozzle mounted on the projected front end of each of said grooved portions, and means releasably retaining said nozzles in position on said grooved portions.

2. An automatic tablet counting and bottling machine comprising a frame having a downwardly and forwardly inclined top portion, a counting board having a plurality of counting channels removably mounted on said frame, a hopper adjustably mounted on said frame over said counting board to receive a quantity of the tablets to be counted and bottled, means for agitating the tablets contained in the hopper to cause them to be fed singly into the channels of said counting board, a gate at the front end of said counting board to hold the tablets in the channels until released, mechanism for holding all of the tablets in the channels behind a preselected lateral line of tablets in the channels when the gate is lowered to free the tablets in front of said lateral line to spill from the open bottom ends of said channels, and means for lowering said gate and simultaneously bringing said mechanism into operation, and a chute mounted on the front of said frame at the lower ends of said channels into which said tablets are spilled when said gate is lowered, said counting board having its channels subdivided into a pair of adjacent counting units with a chute for each of said units, each of said chutes being formed of sheet metal and formed with a grooved portion which has its front end projected beyond the front end of the body of the chute, a nozzle mounted on the projected front end of each of said grooved portions, and means releasably retaining said nozzles in position on said grooved portions, said nozzles having their front ends bent into substantially a complete circle to be received in the necks of bottles to be filled with the tablets.

3. An automatic tablet counting and bottling machine comprising a frame having a downwardly and forwardly inclined top portion, a counting board having a plurality of counting channels removably mounted on said frame, a hopper adjustably mounted on said frame over said counting board to receive a quantity of the tablets to be counted and bottled, means for agitating the tablets contained in the hopper to cause them to be fed singly into the channels of said counting board, a gate at the front end of said counting board to hold the tablets in the channels until released, mechanism for holding all of the tablets in the channels behind a pre-selected lateral line of tablets in the channels when the gate is lowered to free the tablets in front of said lateral line to spill from the open bottom ends of said channels, and means for lowering said gate and simultaneously bringing said mechanism into operation, and a chute mounted on the front of said frame at the lower ends of said channels into which said tablets are spilled when said gate is lowered, said counting board having its channels subdivided into a pair of adjacent counting units with a chute for each of said units, each of said chutes being formed of sheet metal and formed with a grooved portion which has its front end projected beyond the front end of the body of the chute, a nozzle mounted on the projected front end of each of said grooved portions, and means releasably retaining said nozzles in position on said grooved portions, said releasable retaining means comprising spring members, and hooks on the free ends of said spring members to be engaged over the top edges of the overlapped portions of said grooved portions and said nozzles.

4. An automatic tablet counting and bottling machine comprising a frame having a downwardly and forwardly inclined top portion, a counting board having a plurality of counting channels removably mounted on said frame, a hopper adjustably mounted on said frame over said counting board to receive a quantity of the tablets to be counted and bottled, means for agitating the tablets contained in the hopper to cause them to be fed singly into the channels of said counting board, a gate at the front end of said counting board to hold the tablets in the channels until released, mechanism for holding all of the tablets in the channels behind a pre-selected lateral line of tablets in the channels when the gate is lowered to free the tablets in front of said lateral line to spill from the open bottom ends of said channels, and means for lowering said gate and simultaneously bringing said mechanism into operation, said adjustable mounting of said hopper comprising angle irons extended along the sides of said frame, said hopper being mounted on said angle irons, and means adjustably securing said angle irons on the sides of said frame to be adjustable in a plane extended parallel to the inclination of the top of said frame.

5. An automatic tablet counting and bottling machine comprising a frame having a downwardly and forwardly inclined top portion, a counting board having a plurality of counting channels removably mounted on said frame, a hopper adjustably mounted on said frame over said counting board to receive a quantity of the tablets to be counted and bottled, means for agitating the tablets contained in the hopper to cause them to be fed singly into the channels of said counting board, a gate at the front end of said counting board to hold the tablets in the channels until released, mechanism for holding all of the tablets in the channels behind a pre-selected lateral line of tablets in the channels when the gate is lowered to free the tablets in front of said lateral line to spill from the open bottom ends of said channels, and means for lowering said gate and simultaneously bringing said mechanism into operation, said adjustable mounting of said hopper comprising angle irons extended along the sides of said frame, said hopper being mounted on said angle irons, and means adjustably securing said angle irons on the sides of said frame to be adjustable in a plane extended parallel to the inclination of the top of said frame, bolts extending from said frame and projected through elongated slots formed in said angle irons, and thumb nuts threaded onto said bolts to be tightened against said angle irons to hold said angle irons in adjusted positions within the length of said slots forming the adjustable mounting of said angle irons.

6. An automatic tablet counting and bottling machine comprising a frame having a downwardly and forwardly inclined top portion, a counting board having a plurality of counting channels removably mounted on said frame, a hopper adjustably mounted on said frame over said counting board to receive a quantity of the tablets to be counted and bottled, means for agitating the tablets contained in the hopper to cause them to be fed singly into the channels of said counting board, a gate at the front end of said counting board to hold the tablets in the channels until released, mechanism for holding all of the tablets in the channels behind a pre-selected lateral line of tablets in the channels when the gate is lowered to free the tablets in front of said lateral line to spill from the open bottom ends of said channels, and means for lowering said gate and simultaneously bringing said mechanism into operation, said adjustable mounting of said hopper comprising angle irons extended along the sides of said frame, said hopper being mounted on said angle irons, and means adjustably securing said angle irons on the sides of said frame to be adjustable in a plane extended parallel to the inclination of the top of said frame, said angle irons having their front ends extended downward and forward along the sides of said counting board, said tablet holding mechanism being mounted on the front ends of said angle irons to be adjustable therewith.

7. An automatic tablet counting and bottling machine comprising a frame having a downwardly and forwardly inclined top portion, a counting board having a plurality of counting channels removably mounted on said frame, a hopper adjustably mounted on said frame over said counting board to receive a quantity of the tablets to be counted and bottled, means for agitating the tablets contained in the hopper to cause them to be fed singly into the channels of said counting board, a gate at the front end of said counting board to hold the tablets in the channels until released, mechanism for holding all of the tablets in the channels behind a pre-selected lateral line of tablets in the channels when the gate is lowered to free the tablets in front of said lateral line to spill from the open bottom ends of said channels, and means for lowering said gate and simultaneously bringing said mechanism into operation, said adjustable mounting of said hopper comprising angle irons extended along the sides of said frame, said hopper being mounted on said angle irons, and means adjustably securing said angle irons on the sides of said frame to be adjustable in a plane extended parallel to the inclination of the top of said frame, said angle irons having their front ends extended downward and forward along the sides of said counting board, said tablet holding mechanism being mounted on the front ends of said angle irons to be adjustable therewith, and panes of glass extended between the front ends of said angle irons and between said gate and said tablet holding mechanism and between said tablet holding mechanism and said hopper.

8. An automatic tablet counting and bottling machine comprising a frame having a downwardly and forwardly inclined top portion, a counting board having a plurality of counting channels removably mounted on said frame, a hopper adjustably mounted on said frame over said counting board to receive a quantity of the tablets to be counted and bottled, means for agitating the tablets contained in the hopper to cause them to be fed singly into the channels of said counting board, a gate at the front end of said counting board to hold the tablets in the channels until released, mechanism for holding all of the tablets in the channels behind a preselected lateral line of tablets in the channels when the gate is lowered to free the tablets in front of said lateral line to spill from the open bottom ends of said channels, and means for lowering said gate and simultaneously bringing said mechanism into operation, said adjustable mounting of said hopper comprising angle irons extended along the sides of said frame, said hopper being mounted on said angle irons, and means adjustably securing said angle irons on the sides of said frame to be adjustable in a plane extended parallel to the inclination of the top of said frame, said angle irons having their front ends extended downward and forward along the sides of said counting board, said tablet holding mechanism being mounted on the front ends of said angle irons to be adjustable therewith, and panes of glass extended between the front ends of said angle irons and between said gate and said tablet holding mechanism and between said tablet holding mechanism and said hopper, and elevating screws threaded through said angle irons and upon which said panes of glass rest for holding said panes of glass in a desired elevated position above the tablets in said channels.

9. An automatic tablet counting and bottling machine comprising a frame having a downwardly and forwardly inclined top portion, a counting board having a plurality of counting channels removably mounted on said frame, a hopper adjustably mounted on said frame over said counting board to receive a quantity of the tablets to be counted and bottled, means for agitating the tablets contained in the hopper to cause them to be fed singly into the channels of said counting board, a gate at the front end of said counting board to hold the tablets in the channels until released, mechanism for holding all of the tablets in the channels behind a preselected lateral line of tablets in the channels when the gate is lowered to free the tablets in front of said lateral line to spill from the open bottom ends of said channels, and means for lowering said gate and simultaneously bringing said mechanism into operation, said counting board being formed of fibre board, and longitudinally extended laterally spaced metallic strips mounted in spaced grooves cut in said fibre board dividing off said channels.

10. An automatic tablet counting and bottling machine comprising a frame having a downwardly and forwardly inclined top portion, a counting board having a plurality of counting channels removably mounted on said frame, a hopper adjustably mounted on said frame over said counting board to receive a quantity of the tablets to be counted and bottled, means for agitating the tablets contained in the hopper to cause them to be fed singly into the channels of said counting board, a gate at the front end of said counting board to hold the tablets in the channels until released, mechanism for holding all of the tablets in the channels behind a preselected lateral line of tablets in the channels when the gate is lowered to free the tablets in front of said lateral line to spill from the open bottom ends of said channels, and means for lowering said gate and simultaneously bringing said mechanism into operation, said counting board being formed of fibre board, and longitudinally extended laterally spaced metallic strips mounted in spaced grooves cut in said fibre board dividing off said channels, collecting trays mounted beneath said counting board, said counting board being formed with spaced openings in each of its channels through which dust and tablet particles collecting in said channels may pass to fall onto said trays.

11. An automatic tablet counting and bottling machine comprising a frame having a downwardly and forwardly inclined top portion, a counting board having a plurality of counting channels removably mounted on said frame, a hopper adjustably mounted on said frame over said counting board to receive a quantity of the tablets to be counted and bottled, means for agitating the tablets contained in the hopper to cause them to be fed singly into the channels of said counting board, a gate at the front end of said counting board to hold the tablets in the channels until released, mechanism for holding all of the tablets in the channels behind a preselected lateral line of tablets in the channels when the gate is lowered to free the tablets in front of said lateral line to spill from the open bottom ends of said channels, and means for lowering said gate and simultaneously bringing said mechanism into operation, said agitating means comprising a rotative brush and an oscillatory agitator mounted with said hopper, and a single motor controlled transmission for continuously rotating said brush and oscillating said agitator, and a pivotally mounted platform upon which the motor of said motor controlled transmission is mounted so that said transmission may automatically adjust itself to adjustments made in said hopper.

12. An automatic tablet counting and bottling machine comprising a frame having a downwardly and forwardly inclined top portion, a counting board having a plurality of counting channels removably mounted on said frame, a hopper adjustably mounted on said frame over said counting board to receive a quantity of the tablets to be counted and bottled, means for agitating the tablets contained in the hopper to cause them to be fed singly into the channels of said counting board, a gate at the front end of said counting board to hold the tablets in the channels until released, mechanism for holding all of the tablets in the channels behind a pre-selected lateral line of tablets in the channels when the gate is lowered to free the tablets in front of said lateral line to spill from the open bottom ends of said channels, and means for lowering said gate and simultaneously bringing said mechanism into operation, said agitating means comprising a rotative brush and an oscillatory agitator mounted with said hopper, and a single motor controlled transmission for continuously rotating said brush and oscillating said agitator, and a pivotally mounted platform upon which the motor of said motor controlled transmission is mounted so that said transmission may automatically adjust itself to adjustments made in said hopper, said transmission including a belt drive, and means for urging said platform in a direction to properly tension said belt drive.

13. An automatic tablet counting and bottling machine comprising a frame having a downwardly and forwardly inclined top portion, a counting board having a plurality of counting channels removably mounted on said frame, a hopper adjustably mounted on said frame over said counting board to receive a quantity of the tablets to be counted and bottled, means for agitating the tablets contained in the hopper to cause them to be fed singly into the channels of said counting board, a gate at the front end of said counting board to hold the tablets in the channels until released, mechanism for holding all of the tablets in the channels behind a pre-selected lateral line of tablets in the channels when the gate is lowered to free the tablets in front of said lateral line to spill from the open bottom ends of said channels, and means for lowering said gate and simultaneously bringing said mechanism into operation, said agitating means comprising a rotative brush and an oscillatory agitator mounted with said hopper, and a single motor controlled transmission for continuously rotating said brush and oscillating said agitator, a pivotally mounted wall within said hopper, and a baffle flange depending from said pivotally mounted wall between said brush and said agitator to control the feeding of the tablets in the hopper from said agitator to said brush.

14. An automatic tablet counting and bottling machine comprising a frame having a downwardly and forwardly inclined top portion, a counting board having a plurality of counting channels removably mounted on said frame, a hopper adjustably mounted on said frame over said counting board to receive a quantity of the tablets to be counted and bottled, means for agitating the tablets contained in the hopper to cause them to be fed singly into the channels of said counting board, a gate at the front end of said counting board to hold the tablets in the channels until released, mechanism for holding all of the tablets in the channels behind a pre-selected lateral line of tablets in the channels when the gate is lowered to free the tablets in front of said lateral line to spill from the open bottom ends of said channels, and means for lowering said gate and simultaneously bringing said mechanism into operation, said adjustable mounting of said hopper comprising angle irons extended along the sides of said frame, said hopper being mounted on said angle irons, and means adjustably securing said angle irons on the sides of said frame to be adjustable in a plane extended parallel to the inclination of the top of said frame, said angle irons having their front ends extended downward and forward along the sides of said counting board, said tablet holding mechanism being mounted on the front ends of said angle irons to be adjustable therewith, and panes of glass extended between the front ends of said angle irons and between said gate and said tablet holding mechanism and between said tablet holding mechanism and said hopper, said pane of glass between said tablet holding mechanism and said hopper having its top edge extended into said hopper, and a flexible baffle plate mounted on said hopper and engaging the top face of that said pane of glass.

15. An automatic tablet counting and bottling machine comprising a frame having a downwardly and forwardly inclined top portion, a counting board having a plurality of counting channels removably mounted on said frame, a hopper adjustably mounted on said frame over said counting board to receive a quantity of the tablets to be counted and bottled, means for agitating the tablets contained in the hopper to cause them to be fed singly into the channels of said counting board, a gate at the front end of said counting board to hold the tablets in the channels until released, mechanism for holding all of the tablets in the channels behind a pre-selected lateral line of tablets in the channels when the gate is lowered to free the tablets in front of said lateral line to spill from the open bottom ends of said channels, and means for lowering said gate and simultaneously bringing said mechanism into operation, said tablet holding mechanism including a U-shaped member having a channel-shaped intermediate arm overlying the counting board, and strip of rubber mounted in said channel-shaped intermediate arm and depended therefrom.

GEORGE V. CREMIEUX.

REFERENCES CITED

The following references are of record in the file of this patent:

UNITED STATES PATENTS

| Number | Name | Date |
|---|---|---|
| 1,950,909 | Totman | Mar. 13, 1934 |
| 2,233,466 | Ayers | Mar. 4, 1941 |